United States Patent
Lin

(10) Patent No.: US 9,207,414 B2
(45) Date of Patent: Dec. 8, 2015

(54) OPTICAL ENGINE

(71) Applicant: Opto Media Technology Inc., Hsinchu County (TW)

(72) Inventor: Tung Lou Lin, Hsinchu County (TW)

(73) Assignee: OPTO MEDIA TECHNOLOGY INC., Hsinchu County (TW)

( * ) Notice: Subject to any disclaimer, the term of this patent is extended or adjusted under 35 U.S.C. 154(b) by 0 days.

(21) Appl. No.: 14/096,447

(22) Filed: Dec. 4, 2013

(65) Prior Publication Data

US 2015/0153520 A1 Jun. 4, 2015

(51) Int. Cl.
*G02B 6/43* (2006.01)
*G02B 6/42* (2006.01)

(52) U.S. Cl.
CPC .............. *G02B 6/423* (2013.01); *G02B 6/4212* (2013.01)

(58) Field of Classification Search
CPC ....................................................... G02B 6/423
See application file for complete search history.

(56) References Cited

U.S. PATENT DOCUMENTS

| | | | |
|---|---|---|---|
| 5,684,902 A | 11/1997 | Tada | |
| 6,234,687 B1 | 5/2001 | Hall et al. | |
| 6,467,972 B2 * | 10/2002 | Setoguchi | 385/88 |
| 6,676,302 B2 | 1/2004 | Cheng et al. | |
| 2003/0053767 A1 * | 3/2003 | Cheng et al. | 385/89 |
| 2003/0103735 A1 | 6/2003 | Anderson et al. | |
| 2004/0264884 A1 | 12/2004 | Liu | |
| 2014/0099058 A1 * | 4/2014 | Charbonneau-Lefort et al. | 385/33 |
| 2014/0161396 A1 * | 6/2014 | Feng et al. | 385/83 |

FOREIGN PATENT DOCUMENTS

| | | |
|---|---|---|
| CN | 1288465 C | 12/2006 |
| CN | 201903673 U | 7/2011 |

* cited by examiner

*Primary Examiner* — Omar R Rojas
(74) *Attorney, Agent, or Firm* — Chun-Ming Shih

(57) ABSTRACT

An optical engine includes a fiber joint, a fiber pad, and a photoelectric module. The fiber joint, has a fiber installation part and an optical signal output part. The fiber installation part is for accommodating a plurality of fibers, the optical signal output part includes a plurality of fiber positioning through holes running through the optical signal part. Each fiber plugs into one terminal of each positioning through hole and outputs an optical signal via the other terminal of the positioning through hole. The fiber pad is disposed on the fiber installation part and has a plurality of fiber guiding grooves for guiding the fibers to the corresponding fiber positioning through holes. The photoelectric module has a plurality of photoelectric components. Each photoelectric component is aligned with one of the positioning through holes for converting the optical signals coming from the fiber positioning through holes into electric signals.

11 Claims, 22 Drawing Sheets

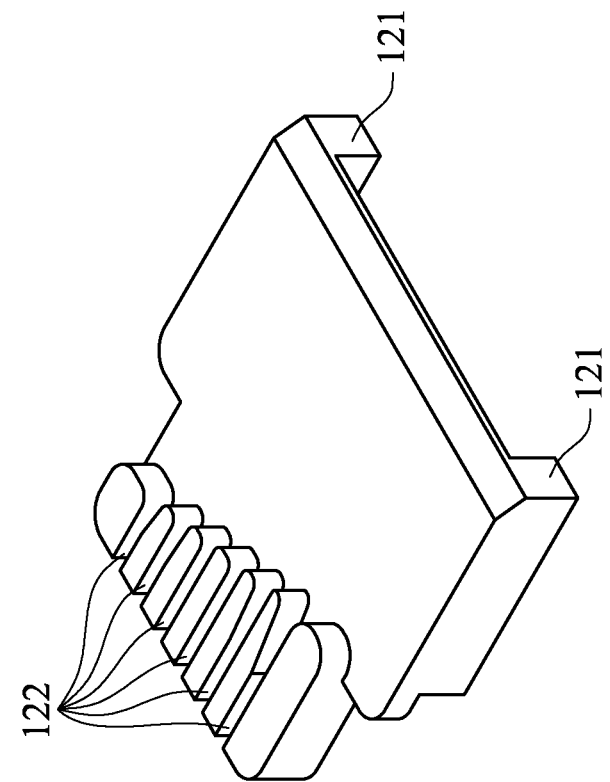

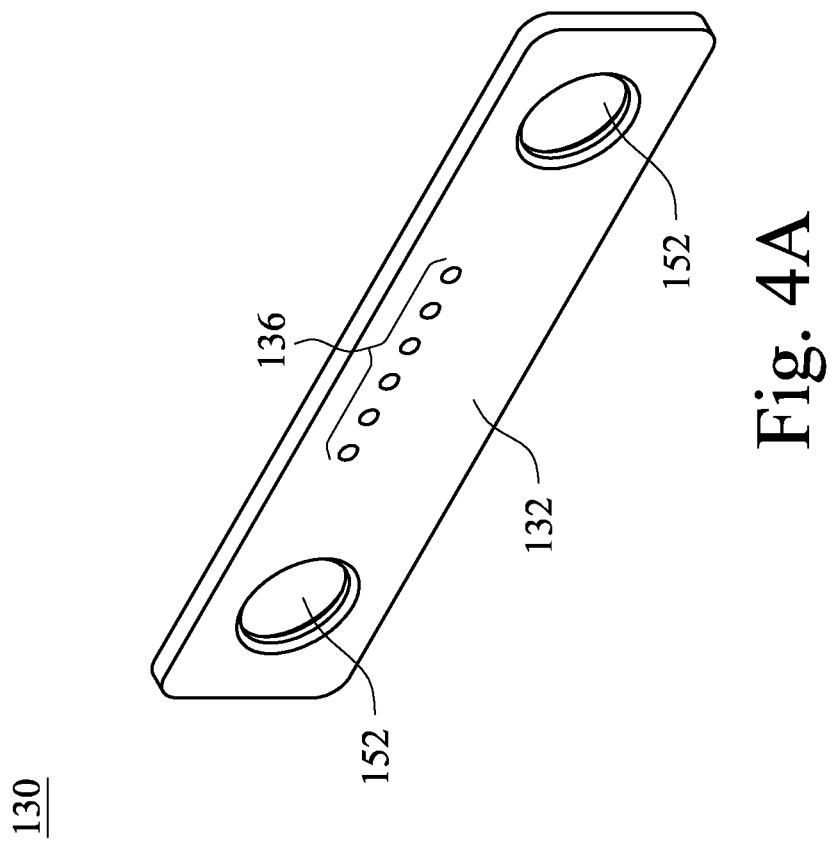

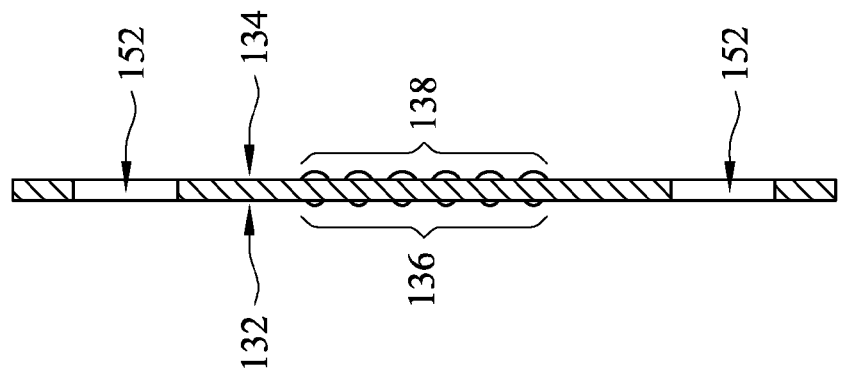

OPTICAL ENGINE

BACKGROUND

1. Technical Field

This disclosure relates to a photoelectric conversion device, especially to a device performing a conversion between an optical and an electric signal.

2. Description of Related Art

As the demand on data transmission quantity and transmission rate are increasing, the old-fashioned way of transmitting data with bronze wires is insufficient for nowadays requirements. In recent years, the high-speed data transmission by optical fibers has been a major trend. In the infrastructure of optical fiber transmission, optical engines are indispensable to perform a conversion between an optical signals and electrical signals, while the method of assembling and the efficiency of photo-coupling of an optical engine had been constantly improved to lower cost and enhance the performance. The following references are referred for understanding the prior arts of the skill: U.S. Pat. Nos. 5,684,902, 6,234,687, 6,676,302; US patent application number 20030103735, 20040264884; China patent number CN1288465C, CN201903673U.

SUMMARY

In view of above problems, this disclosure provides an optical engine which is easy for assembling, with high optical-coupling efficiency and decreased optical path compared to the prior arts.

In the first embodiment, an optical engine including a fiber joint, a fiber pad, a lens set and a photoelectric module is disclosed. The fiber joint has a fiber installation part and an optical signal output part. The fiber installation part is for accommodating a plurality of fibers. The optical signal output part includes a plurality of fiber positioning through holes each positions one of the plurality of fibers with one terminal and outputs an optical signal of the corresponding fiber with the other terminal. The fiber pad is disposed on the fiber installation part and has a plurality of fiber guiding grooves which respectively guide the plurality of fibers to the corresponding fiber positioning through holes. The lens set is coupled to the fiber joint and has an optical signal input side, an optical signal output side, a plurality of first lenses and a plurality of second lenses. The plurality of first lenses are disposed on the optical signal input side for receiving the optical signals coming from the plurality of optical positioning through holes. The plurality of second lenses are disposed on the optical signal output side for outputting the optical signals originated from the plurality of first lenses. The photoelectric module is coupled to the lens set and has a plurality of photoelectric components for converting the optical signals coming from the plurality of second lenses into electric signals.

In the second embodiment, an optical engine including a fiber joint, a fiber pad and a photoelectric module is disclosed. The fiber joint has a fiber installation part and an optical signal output part. The fiber installation part is for accommodating a plurality of fibers. The optical signal output part includes a plurality of fiber positioning through holes each positions one of the plurality of fibers with one terminal and outputs an optical signal of the corresponding fiber with the other terminal. The fiber pad is disposed on the fiber installation part and has a plurality of fiber guiding grooves which respectively guide the plurality of fibers to the corresponding fiber positioning through holes. The photoelectric module is assembled to the fiber joint and has a plurality of photoelectric components for converting the optical signals coming from the plurality of fiber positioning through holes into electric signals.

In the third embodiment, an optical engine including a fiber joint, a lens set and a photoelectric module is disclosed. The fiber joint has a fiber installation part and an optical signal output part. The fiber installation part is for accommodating a plurality of fibers. The optical signal output part includes a plurality of fiber positioning through holes each positions one of the plurality of fibers with one terminal and outputs an optical signal of the corresponding fiber with the other terminal. The lens set is assembled to the fiber joint and has an optical signal input side, an optical signal output side, a plurality of first lenses and a plurality of second lenses. The plurality of first lenses are disposed on the optical signal input side for receiving the optical signals coming from the plurality of optical positioning through holes. The plurality of second lenses are disposed on the optical signal output side for outputting the optical signals originated from the plurality of first lenses. Diameters of the plurality of first lenses are different from those of the plurality of second lenses. The photoelectric module is assembled to the lens set and the fiber joint. The photoelectric module has a plurality of photoelectric components for converting the optical signals coming from the plurality of second lenses into electric signals.

In the fourth embodiment, an optical engine including a fiber joint, a photoelectric module and a plurality of positioning components is disclosed. The fiber joint includes a fiber installation part and an optical signal output part. The fiber installation part is for accommodating a plurality of fibers. The optical signal output part includes a plurality of fiber positioning through holes and a plurality of positioning hole. Each of the plurality of fiber positioning through holes positions one of the plurality of fibers with one terminal and outputs an optical signal of the corresponding fiber with the other terminal. The photoelectric module is assembled to the fiber joint and includes a plurality of photoelectric components and a plurality of positioning parts. The plurality of photoelectric components is for converting the optical signals coming from the plurality of fiber positioning through holes into electric signals. Each of the plurality of positioning parts has a positioning component guiding groove and a positioning hole. The positioning component guiding groove is for guiding and plugging a positioning component into the positioning hole. The plurality of positioning components is combined with the plurality of positioning holes on the fiber joint and the photoelectric module respectively to assemble the fiber joint and the photoelectric module detachably. The plurality of positioning components are discrete components separated from the fiber joint and the photoelectric module before assembling.

In the last embodiment, an optical engine including a fiber join, a photoelectric module, a circuit board and a plurality of amplifiers is disclosed. The fiber joint has a fiber installation part and an optical signal output part. The fiber installation is for accommodating a plurality of fibers. The optical signal output part includes a plurality of fiber positioning through holes each positions one of the plurality of fibers with one terminal and outputs an optical signal of the corresponding fiber with the other terminal. The photoelectric module is assembled to the fiber joint and includes a plurality of photoelectric components and a plurality of output conducting lines. The plurality of photoelectric components are disposed on a first surface of the photoelectric module and for converting the optical signals coming from the plurality of fiber positioning through holes into electric signals. The plurality of output conducting lines are bent to be disposed on the first surface and a second surface of the photoelectric module wherein one terminal of each of the plurality of output conducting lines disposed on the first surface and electrically connected to one of the plurality of the photoelectric components, and the other terminal of each of the plurality of output conducting lines disposed on the second surface. The circuit board has a plurality of through holes wherein the fiber joint and the photoelectric module are disposed on a top surface of the circuit board. The plurality of output conducting lines are electrically connected to the circuit board. The plurality of fiber amplifiers are disposed on a bottom surface of the circuit board and electrically connected to the plurality of output conducting lines via the plurality of through holes for receiving and amplifying the electric signals on the plurality of output conducting lines.

These and other objectives of this disclosure will no doubt become obvious to those of ordinary skill in the art after reading the following detailed description of the preferred embodiments that is illustrated in the various figures and drawings.

BRIEF DESCRIPTION OF THE DRAWINGS

FIG. 3A is a perspective view of an embodiment of a fiber pad of the optical engine in FIG. 1A and FIG. 1B.

FIG. 4A is a perspective view of an embodiment of an optical signal input side of a lens set in FIG. 1A and FIG. 1B.

FIG. 4C is a side view of the lens set in FIG. 4A and FIG. 4B.

DETAILED DESCRIPTION OF THE EMBODIMENTS

Figure 1A:
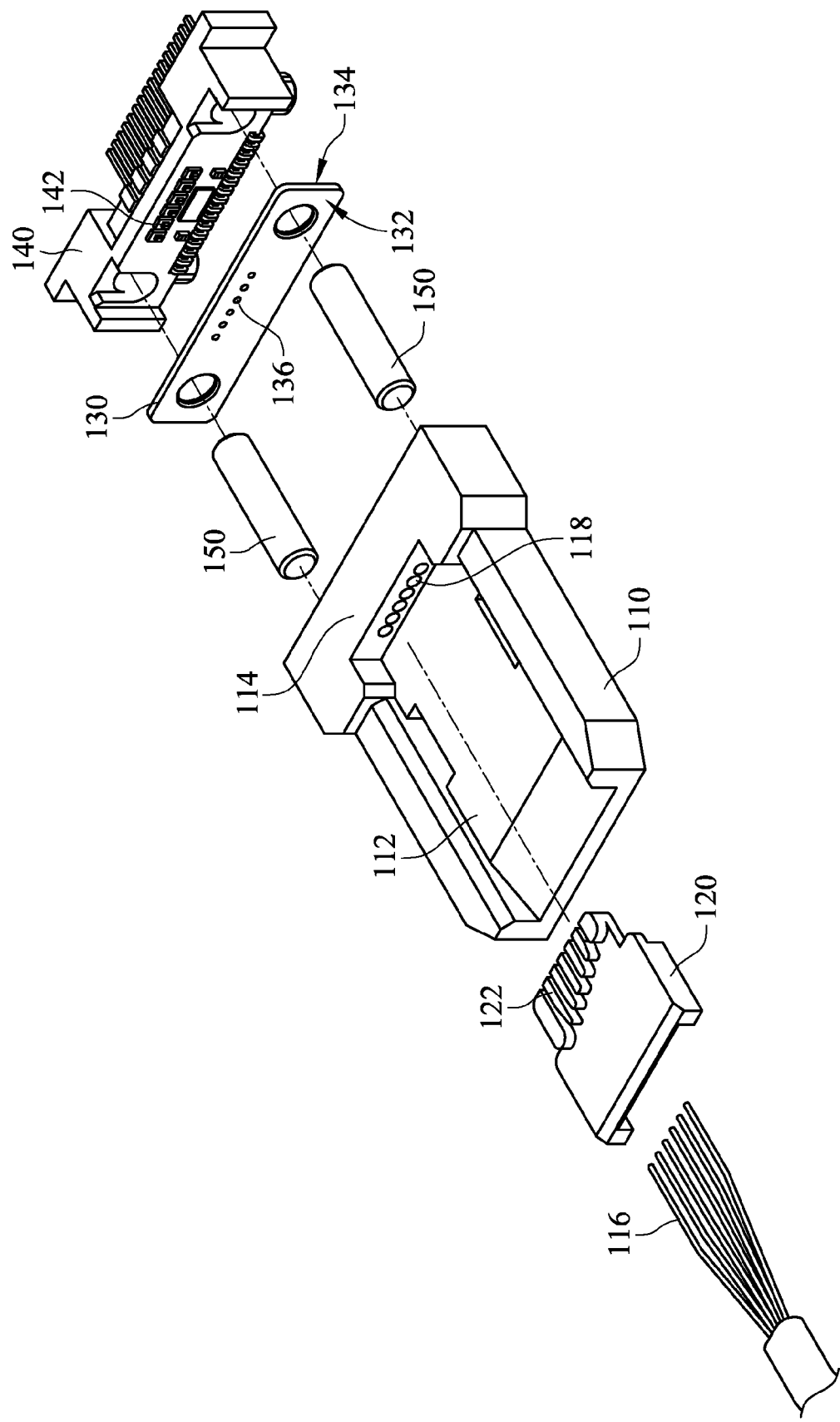
FIG. 1A is an exploded view of the first embodiment of an optical engine of the present disclosure.
Figure 1B:
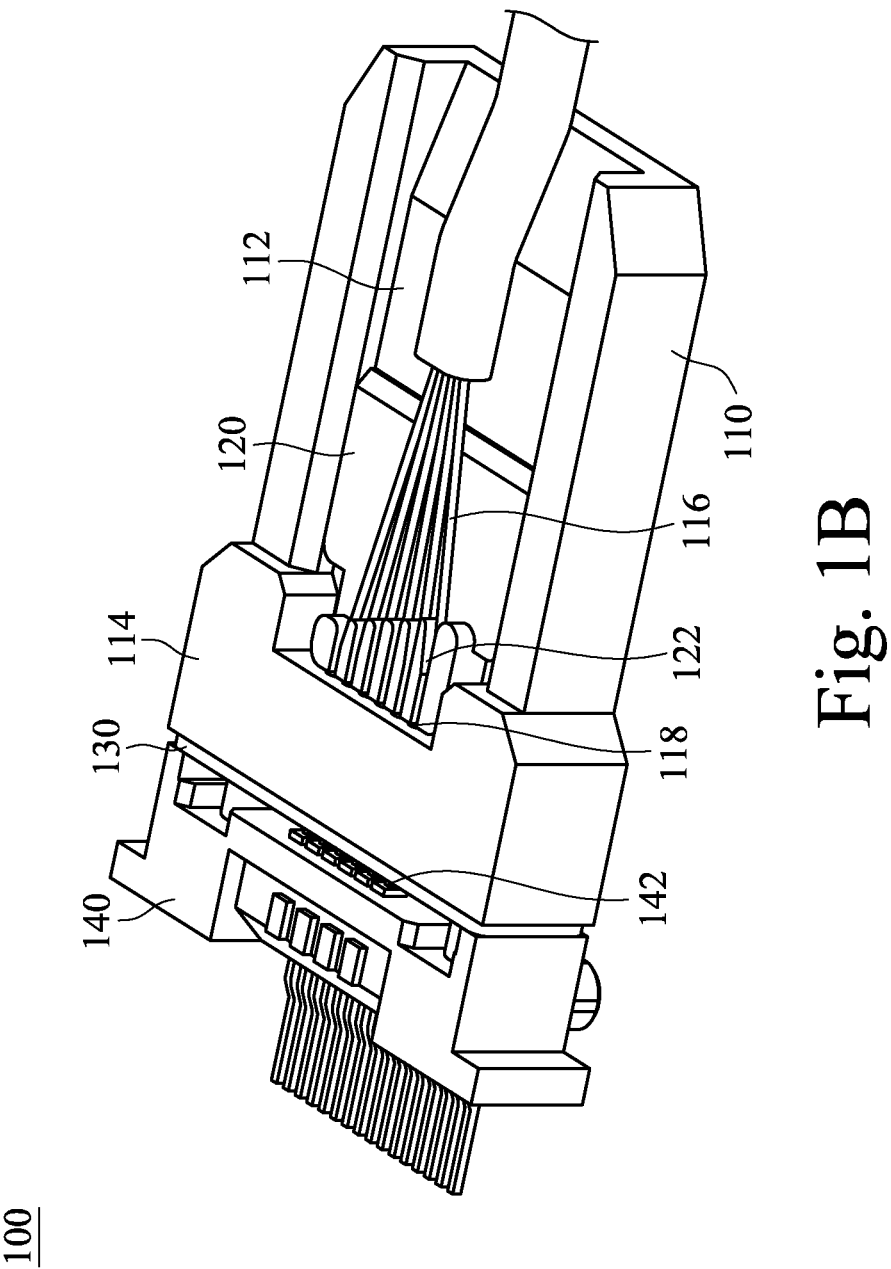
FIG. 1B is a perspective view of the first embodiment of an optical engine of the present disclosure.

FIG. 1A and FIG. 1B are respectively an exploded view and a perspective view of the first embodiment of an optical engine 100 of the present disclosure. As shown in the figures, the optical engine 100 of the embodiment includes a fiber joint 110, a fiber pad 120, a lens set 130 and a photoelectric module 140.

The fiber joint 110 has a fiber installation part 112 and an optical signal output part 114. The fiber installation part 112 is for accommodating a plurality of fibers 116. The optical signal output part 114 includes a plurality of fiber positioning through holes 118 each positions one of the plurality of fibers 116 when plugging thereto and outputs an optical signal of the corresponding one of the plurality of fibers 116.

The fiber pad 120 is disposed on the fiber installation part 112 and has a plurality of fiber guiding grooves 122 which respectively guide the plurality of fibers 116 to the corresponding fiber positioning through holes 118.

The lens set 130 is coupled to and assembled to the optical signal output part 114 of the fiber joint 110 for enhancing an efficiency of the optical coupling. The lens set 130 has an optical signal input side 132, an optical signal output side 134, a plurality of first lenses 136 and a plurality of second lenses 138 (please refer to FIG. 4A and FIG. 4B). The plurality of first lenses 136 are disposed on the optical signal input side 132 for receiving the optical signals coming from the plurality of optical positioning through holes 118. The plurality of second lenses 138 are disposed on the optical signal output side 134 for outputting the optical signals originated from the plurality of first lenses 136.

The photoelectric module 140 is coupled to and assembled to the lens set 130 and the fiber joint 110. The photoelectric module 140 has a plurality of photoelectric components 140, such as photodiodes, for converting the optical signals coming from the plurality of second lenses 138 to electric signals.

In this embodiment, the optical engine 100 can further include at a plurality of positioning components 150, and the optical signal output part 114 of the fiber joint 110, the lens set 130 and the photoelectric module 140 can respectively include a plurality of positioning holes 152 matching to the plurality of positioning components 150 assembling the fiber joint 110, the lens set 130 and the photoelectric module 140 detachably. As shown in FIG. 1A, one terminal of each positioning component 150 is plugged to one of the positioning holes 152 of fiber joint 110, and the other terminal of each positioning component 150 is plugged to one of the positioning holes 152 of photoelectric module 140 through one of the positioning holes 152 of the lens set 130. Thus all aforementioned components are assembled together. Note that the plurality of positioning components 150 are discrete components separated from the fiber joint 110, the lens set 130 and the photoelectric module 140 before assembling.

It is also noted that though the plurality of positioning components 150 of this embodiment are discrete components, it is not meant to limit the scope of the present disclosure. For example the positioning components 150 can be directly disposed or formed on the fiber joint 110 or the photoelectric module 140 before assembling, or they can be respectively disposed or formed on the fiber joint 110 and the photoelectric module 140 before assembling. Then together with the positioning holes 152 of the lens set 130, all the fiber joint 110, the lens set 130 and the photoelectric module 140 are assembled into one piece.

As shown in FIG. 1A and FIG. 1B, the preceding paragraphs described an operation of the optical engine 100 as a receiving terminal. However the optical engine 100 of this embodiment can also be adopted as a transmitting terminal. As shown in the figures, when the optical engine 100 is adopted as a transmitting terminal, a plurality of photoelectric components 142 of the photoelectric module 140 receive a plurality of electric signals and convert them into a plurality of optical signals outputting to the plurality of second senses 138 of the lens set 130. Said optical signals are then passed to the plurality of fiber positioning through holes 118 through the second lenses 138 and the first lenses 136, and respectively coupled to the plurality of fibers 116 positioned by the fiber positioning through holes 118. Thus the optical signals can be transmitted to a far end through the plurality of fibers 116.

Note that it is common knowledge to those skilled in the art that the optical engine 100 of the present disclosure described as a receiving terminal can also be adopted as a transmitting terminal. Thus once the optical engine 100 of the present disclosure as a receiving terminal is clearly described in the following embodiments, the corresponding adoptions as a transmitting terminal will not be described further and can still be fully understand by those skilled in the art.

Figure 2A:
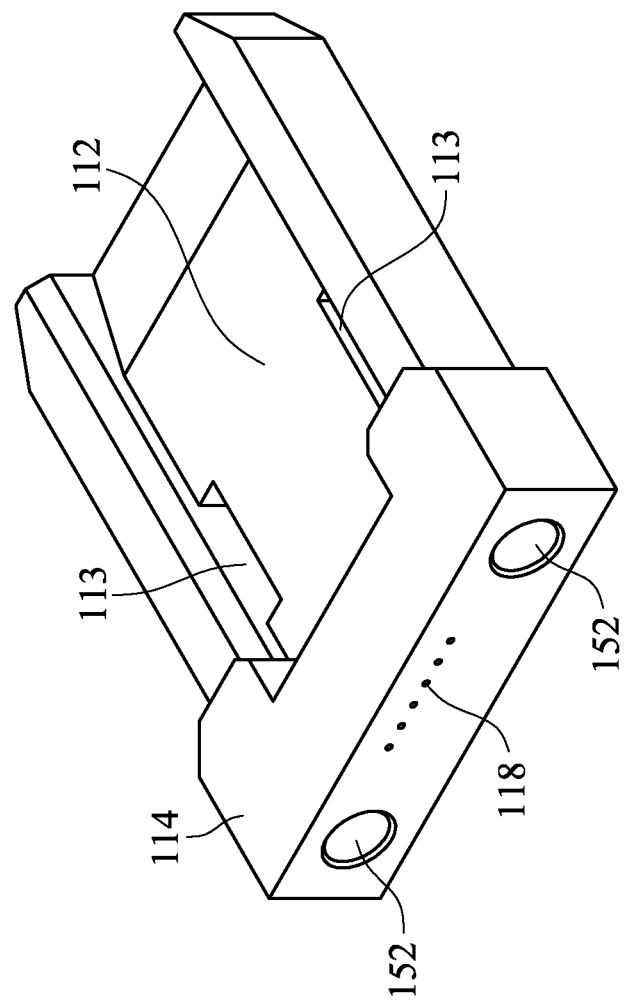
FIG. 2A is a perspective view of an embodiment of a fiber joint of the optical engine in FIG. 1A and FIG. 1B.
Figure 2B:
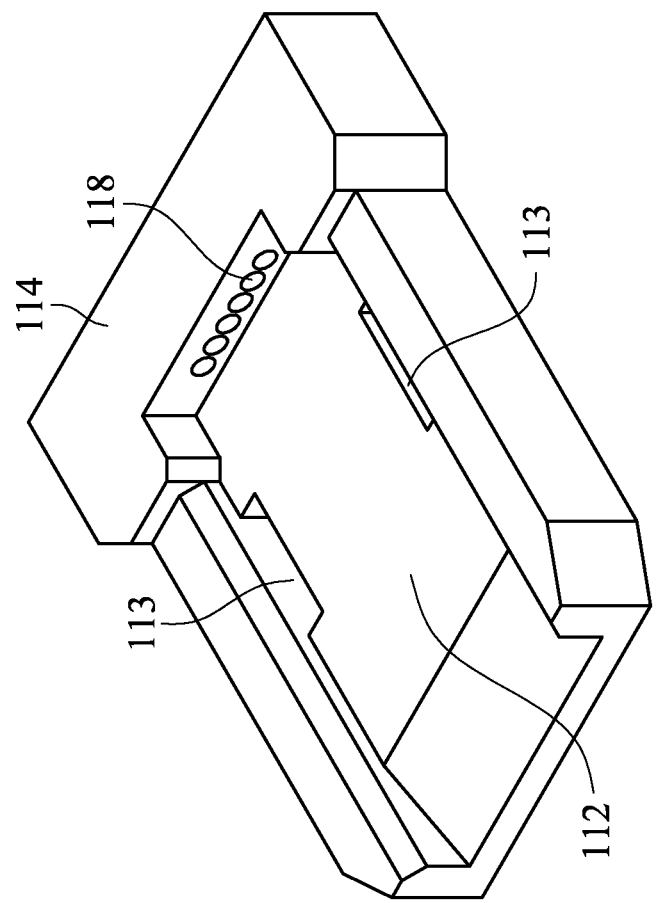
FIG. 2B is another perspective view of the fiber joint in FIG. 2A.

FIG. 2A and FIG. 2B are perspective views of an embodiment of the fiber joint 110. As shown in the figures, the fiber installation part 112 of the fiber joint 110 includes at least one first fixing part 113, which are two assembling slots in this embodiment, for fixing the fiber pad 120. The volume, shape and location of the first fixing part 113 shown in this embodiment are not meant to limit the scope of the present disclosure. Those skilled in the art can determine the volume, shape and location of the first fixing part 113 according to different applications after understanding the present disclosure to fix the fiber pad 120 to the fiber installation part 112. Also note that though the fiber pad 120 is fixed to the fiber joint 110 by the first fixing part 113 in this embodiment, it is not meant to limit the scope of the present disclosure. Other prior arts, such as gluing, screwing and molding, can be adopted in the present disclosure to fix the fiber pad 120 to the fiber joint 110.

Figure 2C:
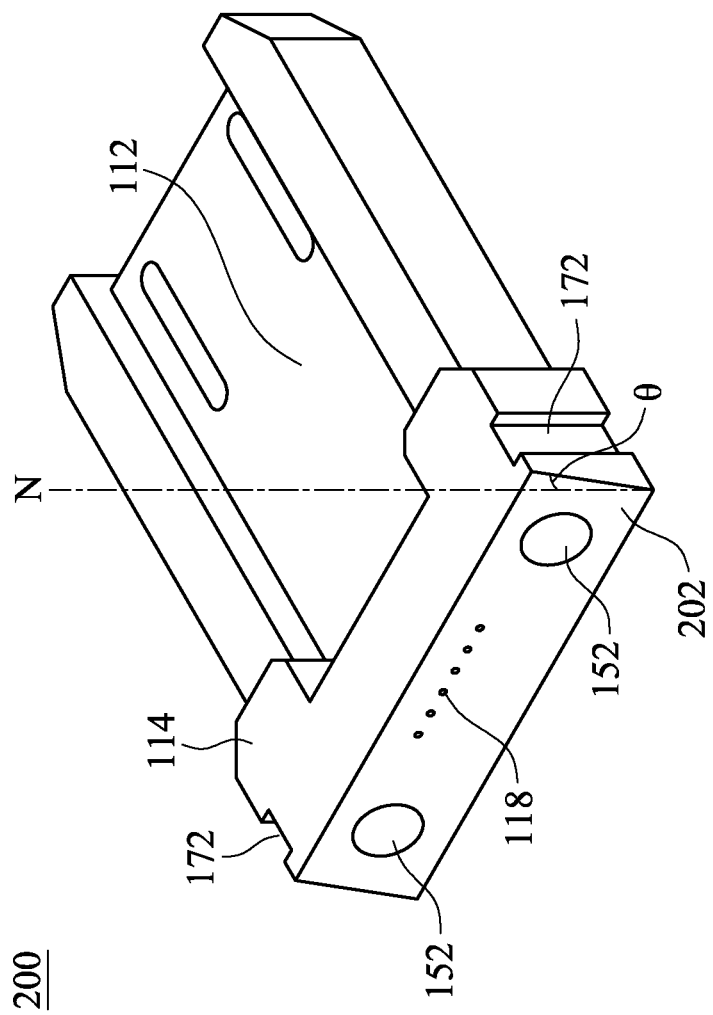
FIG. 2C is a perspective view of another embodiment of a fiber joint of the optical engine in FIG. 1A and FIG. 1B.

FIG. 2C is a perspective view of another embodiment of the fiber joint. As shown in figure, the surface of the fiber joint 200 adopted to assemble and couple to the lens set 130 is an inclined plane 202. Thus an interference caused by a partial reflection when an optical signal walking through an interface formed on the inclined plane 202 can be alleviated. Also a gap formed by the inclined plane 202 can be adopted to observe the alignment of the photoelectric components 142 and the fibers 116 to determine if an adjustment should be performed. In this embodiment, the inclined plane is formed by mechanical polishing, and an angle theta between the inclined plane and a vertical line is between 1 and 6 degrees wherein 1 and 6 degrees are included. The preferred angle is between 4 and 6 degrees wherein 4 and 6 degrees are included. Besides in this embodiment, both sides of the optical signal output part 114 of the fiber joint 200 can further include a plurality of assembling grooves 172 for assembling to a cover which is adopted for shielding and protection. Note that the way of forming the inclined plane, the design value of the angle theta and the design of the assembling grooves 172 in this embodiment is for illustration purpose but not to limit the scope of the present disclosure. Those skilled in the art can perform equivalent implementations of this embodiment according to the present disclosure. For example the inclined plane 202 can be formed concurrently with the fiber joint 200 by injection molding, or the inclined plane 202 can be formed by performing laser cutting on fiber joint 200. The inclined plane 202 can be multi-sectional such as bi-sectional. The fiber joint 200 can be assembled to the cover by gluing, screwing or molding instead of by the guiding grooves 172.

Figure 3B:
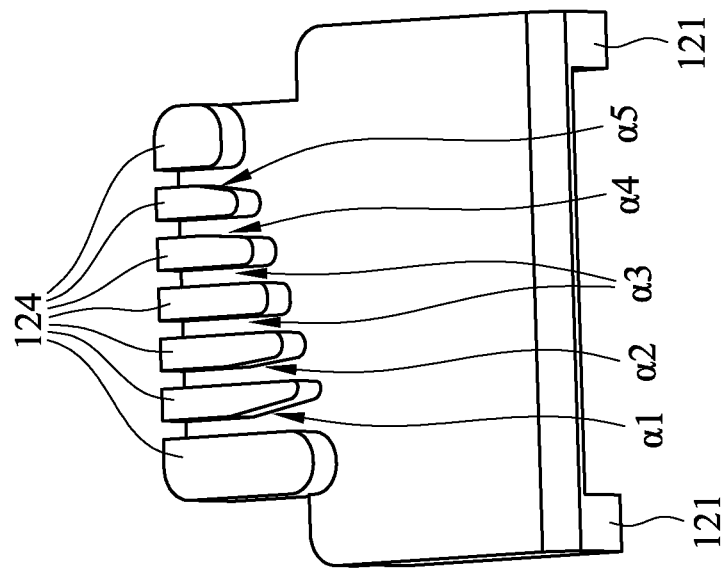
FIG. 3B is another perspective view of the fiber pad in FIG. 3A.

FIG. 3A and FIG. 3B are perspective views of an embodiment of the fiber pad 120 of the optical engine 100 in FIG. 1A and FIG. 1B. The fiber pad 120 includes at least one second fixing part 121, which are two assembling tenons in this embodiment, matching to the first fixing part 113 of the fiber installation part 112 on structure to fix the fiber pad 120 to the fiber installation part 112 by assembling the second fixing part 121 to the first fixing part 113. The volume, shape and location of the second fixing part 121 shown in this embodiment are not meant to limit the scope of the present disclosure. Those skilled in the art can determine the volume, shape and location of the second fixing part 121 matching to the first fixing part 113 according to different applications after understanding the present disclosure. Also note that the fiber pad 120 can be fixed to the fiber joint 110 by other prior arts such as gluing, screwing and molding.

As shown in FIG. 3A and FIG. 3B, in this embodiment, the lengths of the plurality of fiber guiding grooves 122 of the fiber pad 120 increase or decrease gradually on space. The fiber pad 120 further includes a plurality of separating islands 124 for separating the plurality of fiber guiding grooves 122. Different angles α can be designed between a plane of each of side walls of the separating islands 124 and a tangent line of the corresponding guiding groove wherein the side walls are at the terminal away from the fiber positioning through holes 118. The angle α corresponding to the separating islands 120 at the both sides of the fiber pad 120 can be designed larger, for example 8 degrees, while the angle α corresponding to the separating islands 120 in between can be designed smaller, for example 0 degrees. Thus enhance the convenience when installing fibers thereto. Note that the design of increasing or decreasing the lengths of the fiber guiding grooves 112 gradually on space and the design of the angle α, for example in FIG. 3B the angles α1, α2, α3, α4, α5 are 8 degrees, 4.5 degrees, 0 degrees, 4.5 degrees and 8 degrees respectively, is not meant to limit the scope of the present disclosure. Those skilled in the art can determine the lengths of the fiber guiding grooves 122 and the angle α according to different applications after understanding the present disclosure. For example the lengths of the plurality of fiber guiding grooves 122 can be all the same or different values for each. The arrangement of the lengths of the plurality of fiber guiding grooves 122 can be increasing or decreasing gradually on space, or be longer or shorter for those at the both sides, or even be arbitrary value for each. The angles α, which can be zero or non-zero, for a part of or all the terminals of the separating islands 124 away from the fiber positioning through holes 118 can be all the same or different values for each. The arrangement of the angles α can be increasing or decreasing gradually on space, or be longer or shorter for those at the both sides, or even be arbitrary value for each.

Figure 4B:
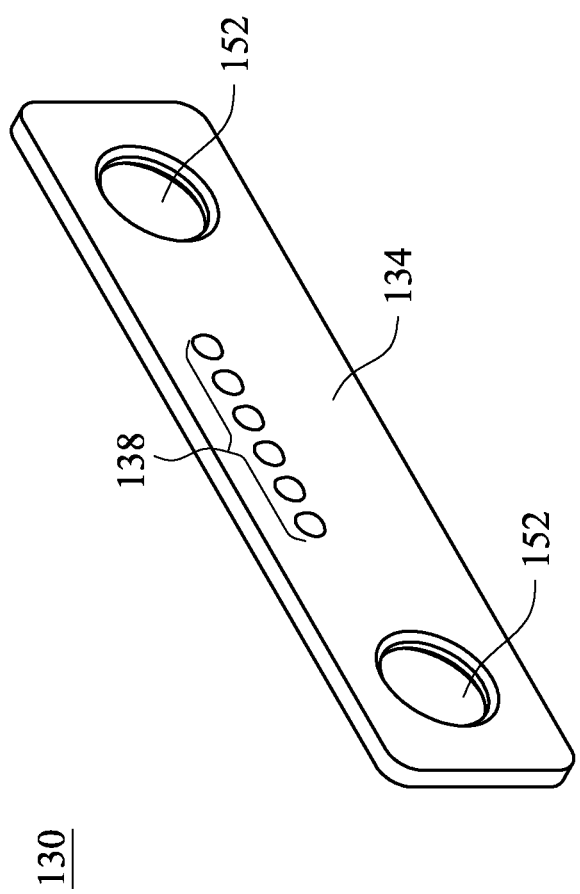
FIG. 4B is a perspective view of an embodiment of an optical signal output side of the lens set in FIG. 1A and FIG. 1B.

FIG. 4A and FIG. 4B are perspective views of an embodiment of the lens set 130 in FIG. 1A and FIG. 1B. In this embodiment, diameters of the plurality of the first lenses 136 are smaller than those of the plurality of the second lenses 138. That is, the first lenses 136 disposed on the optical signal input side 132 are lens with small diameters while the second lenses 138 disposed on the optical signal output side 134 are lens with large diameters. Besides, the first lenses 136 and the second lenses 138 in this embodiment are aspheric lenses. Thus the efficiency of the optical coupling of the present disclosure can be enhanced up to 50%, and the optical path can be effectively decreased. However the embodiment described in this paragraph is a best mode but not to limit the scope of the present disclosure. Those skilled in the art can design diameters and categories of the lenses according to different applications considering optical path and wavelength after understanding the present disclosure. For example the diameters of the first lenses 136 can be equal to or larger than those of the second lenses 138. The first lenses 136 and the second lenses 138 can be all spherical lenses, spherical lenses and aspheric lenses respectively, or vice versa.

Figure 5A:
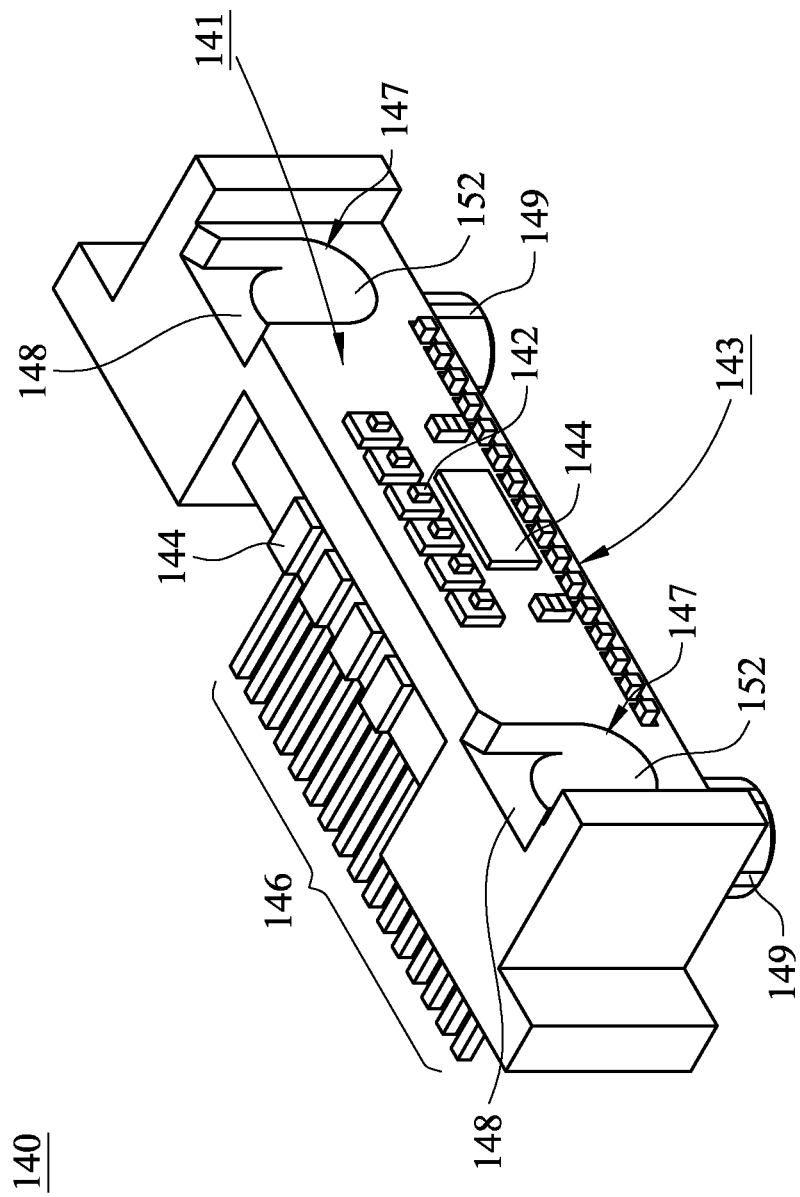
FIG. 5A is a perspective view of an embodiment of a photoelectric module in FIG. 1A and FIG. 1B.

FIG. 5A is a perspective view of an embodiment of the photoelectric module 140 in FIG. 1A and FIG. 1B. In this embodiment the photoelectric module 140 includes a plurality of photoelectric components 142, a plurality of amplifiers 144 and a plurality of output terminals 146. The plurality of amplifiers 144 are for amplifying electric signals coming from the plurality of photoelectric components 142 and outputting the amplified signals. The plurality of output terminals 146 are for conducting the amplified signals coming from the amplifiers 144. Besides, a part of the plurality of amplifiers 144 and the plurality of photoelectric components 142 are disposed on the same plane and electrically connected to each other, and the rest of the plurality of amplifiers 144 are disposed on another plane perpendicular to the plane the photoelectric components 142 disposed thereon and are electrically connected to the photoelectric components 142 by wire-bonding. The photoelectric module 140 further includes a plurality of positioning parts 147 each has a positioning component guiding groove 148 and a positioning hole 152. The positioning component guiding groove 148 is for guiding and plugging a positioning component, for example the aforementioned independent positioning components 150), into the positioning hole 152. Thus facilitate the assembling and positioning of the related parts. Moreover, the photoelectric module 140 can further comprise a plurality of circuit board positioning parts 149 for fixing the photoelectric module 140 to a circuit board.

Note that in the prior arts, the amplifiers and the photoelectric module are disposed separately on the same plane of a circuit board. However in the aforementioned embodiment, the amplifiers 144 are disposed directly on the photoelectric module 140 having the photoelectric components 142. Compared to the prior arts, the distance between the photoelectric components 142 and the amplifier 144 are decreased, thus the noise in high-frequency transmission is alleviated. The photoelectric components 142 and the amplifier 144 can also be electrically connected by wire-bonding and packaged together to lower the transmission loss. Besides, the positioning parts 147 disclosed in the aforementioned embodiment can facilitate the assembling of the optical engine 100 compared to the prior arts. Note that besides fixing the photoelectric module 140 to a circuit board by the circuit board positioning parts 149 as described in the aforementioned embodiment, other methods can also be adopted such as gluing, screwing or molding.

Also note that though the plurality of amplifiers 144 are disclosed as disposed on two separated planes in the aforementioned embodiment, it is not meant to limit the scope of the present disclosure. For example the plurality of amplifiers 144 can be incorporated into one amplifier module comprising a plurality of amplifying circuits and is disposed on any one of the two said planes. The plurality of amplifiers 144 can also be disposed on only one of the two said planes.

Figure 5B:
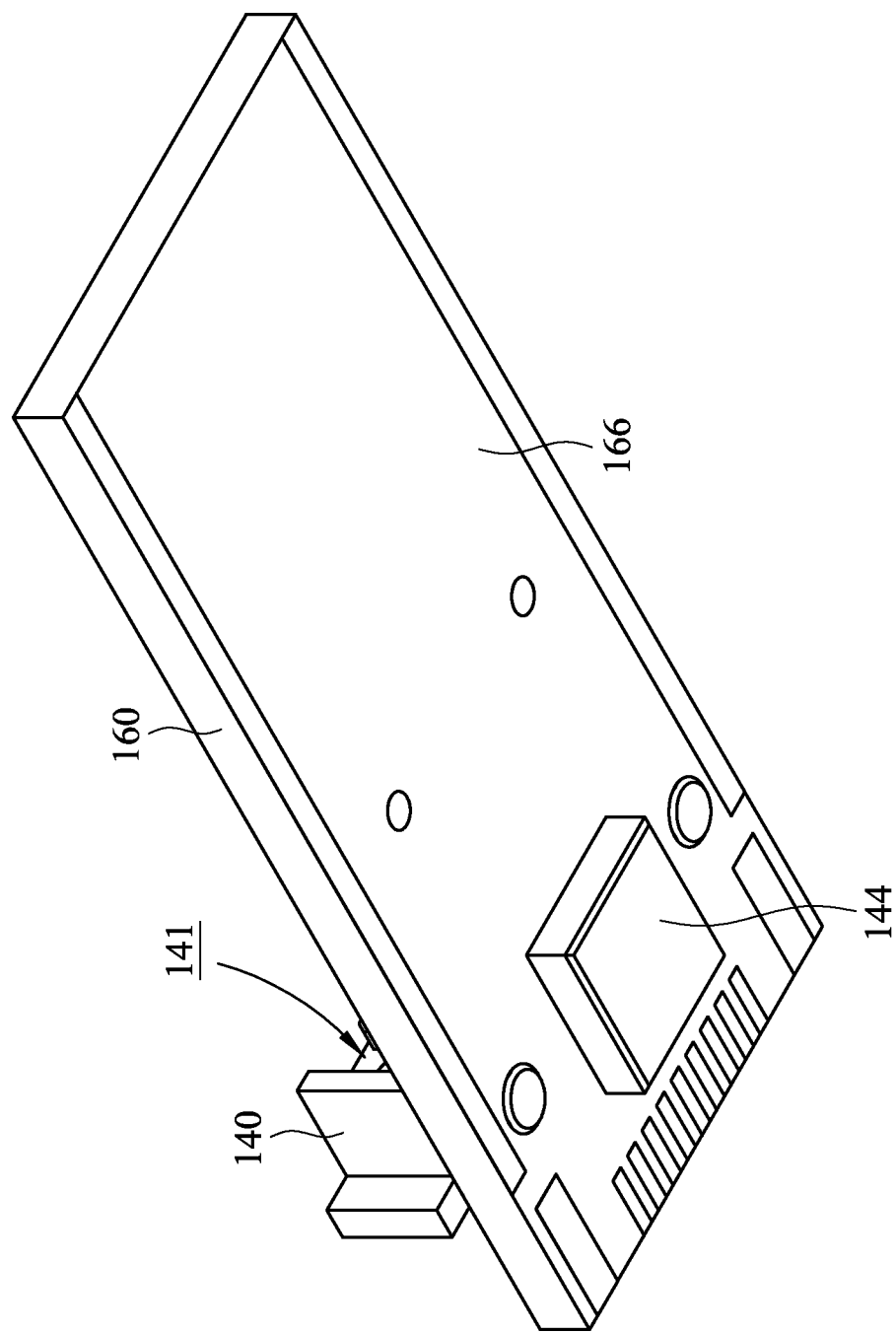
FIG. 5B is a perspective view of another embodiment of a photoelectric module in FIG. 1A and FIG. 1B.
Figure 5C:
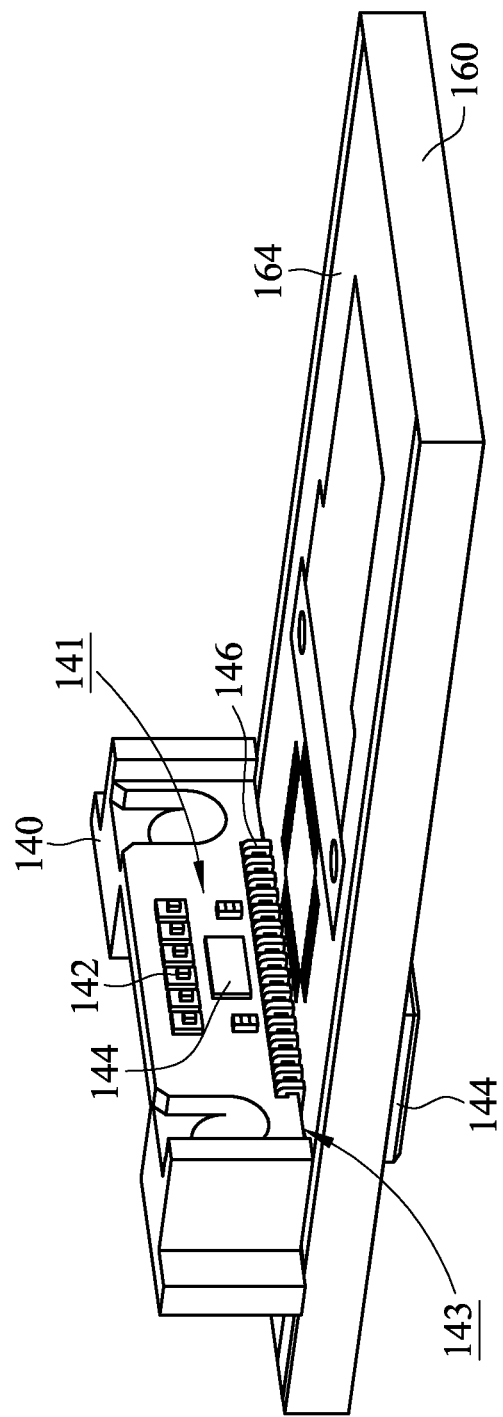
FIG. 5C is another perspective view of the photoelectric module in FIG. 5A.
Figure 5D:
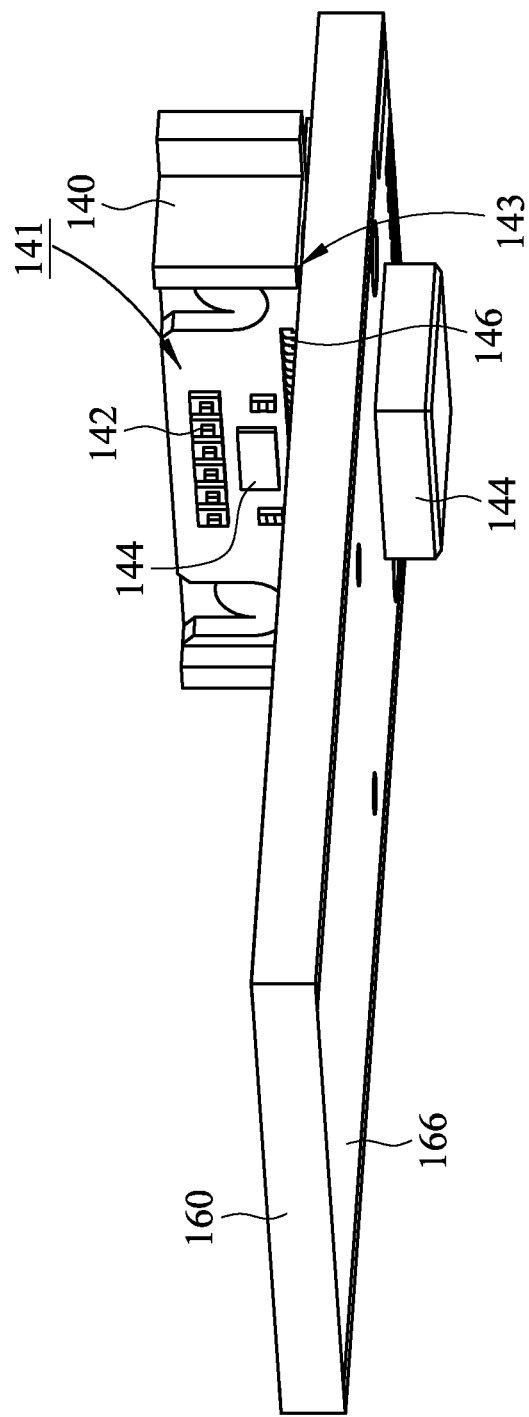
FIG. 5D is still another perspective view of the photoelectric module in FIG. 5A.

FIG. 5B, FIG. 5C and FIG. 5D are perspective views of another embodiment of the photoelectric module 140 in FIG. 1A and FIG. 1B. The major difference of this embodiment and that of FIG. 5A is the structural design of the output terminals 146 of the photoelectric module 140, the allocation of the amplifiers 144 and the electrical conducting path between the amplifier 144 and the output terminals 146. As shown in FIG. 5B, the photoelectric module 140 includes a plurality of photoelectric components 142 and a plurality of output conducting lines 146. The plurality of photoelectric components 142 are disposed on a first surface 141 of the photoelectric module 140 for converting the optical signals coming from the plurality of fiber positioning through holes 118 into electric signals. The plurality of output conducting lines 146 are bent to be disposed on the first surface 141 and a second surface 143, such as a bottom surface, of the photoelectric module 140, wherein one terminal of each of the plurality of output conducting lines 146 is disposed on the first surface 141 and electrically connected to one of the plurality of the photoelectric components 142 while the other terminal of each of the plurality of output conducting lines 146 is disposed on the second surface 143 and electrically connected to a circuit board 160. The circuit board 160 includes a plurality of through holes (not shown in the figures). The aforementioned fiber joint 110, the lens set 130 and the photoelectric module 140 are disposed on a top surface 164 of the circuit board 160. The plurality of output conducting lines 146 are electrically connected to the plurality of through holes of the circuit board 160. Moreover, a plurality of amplifiers 144 are disposed on a bottom surface 166 of the circuit board 160 at a location closest to or corresponding to the plurality of output conducting lines 146 to minimize the distance of signal transmission. The plurality of amplifiers 144 are electrically connected to the plurality of output conducting lines 146 via the plurality of through holes for receiving and amplifying the electric signals on the plurality that of output conducting lines 146.

Note that this embodiment can be applied when the surface of the photoelectric module 140 is not large enough for disposing all amplifiers 144. Instead of that, all or some of the amplifiers 144 are disposed on the circuit board 160 and by applying the way disclosed in this embodiment, the signal transmission distance between the amplifiers 144 and the photoelectric module 146 can be effectively decreased. In other words, by the structure of the output conducting lines 146 bent along the first surface 141 and the second surface 143 of the photoelectric module 140, and by allocating the plurality of amplifiers 144 closest to or corresponding to the output conducting lines 146 and electrically connected to them via the through holes of the circuit board 160, the noise in high-frequency transmission can be alleviated because the distance between the photoelectric components 142 and the amplifiers 144 is decreased compared to the prior arts. Also the design is simplified and the transmission loss is decreased compared to the prior arts. Also note that the positioning parts 147 shown in FIG. 5A can be applied in this embodiment to facilitate the assembling of the photoelectric module 140 in the photo engine 100 compared to the prior arts.

Please refer to FIG. 5A again. In this embodiment, each amplifier 144 can further include one or many driving circuits. Thus when the photoelectric module 140 of the optical engine 100 is adopted as a signal transmitter, the driving circuits can send a plurality of electric signals to and drive the photoelectric components 142 to generate a plurality of optical signals accordingly. The plurality of optical signals are sent to the fiber joint 110 through the second lenses 138, the first senses 136 sequentially, then photo-coupled to the plurality of fibers 116 disposed on the fiber joint 110. Finally the plurality of optical signals are sent to a far-end terminal through the fibers 116. Besides, to optimize the transmission rate when considering the transmission distance to the far-end terminal, the amplifiers 144 can be designed as in the following descriptions. The part of the amplifiers 144 disposed on the same plane as the photoelectric components 142 can include one or many high-speed driving circuits to drive the photoelectric components 142 with higher transmission rate when the transmission distance is shorter since this part of the amplifiers 144 are closer to the photoelectric components which induce less transmission loss and less noise in high-frequency transmission. While the rest of the amplifiers 144 disposed on another plane perpendicular to the plane the photoelectric components 142 disposed thereon can include one or many low-speed driving circuits to drive the photoelectric components 142 with lower transmission rate when the transmission distance is longer. The embodiment described in this paragraph is not to limit the scope of the present disclosure. Those skilled in the art can determine the volume and category of the driving circuits designed in the amplifiers according to the practical requirements on applications after understanding the present disclosure. For example each of the amplifiers 144 can include one or many high-speed driving circuits to provide higher transmission rate, or each of the amplifiers 144 can include one or many low-speed driving circuits to provide lower transmission rate. Even only one of the amplifiers 144 includes many high-speed and/or low-speed driving circuits. Besides, those skilled in the art can adopt independent drivers (not shown in the figures) instead of the driving circuits incorporated in the amplifiers 144 and determine the volume, category and allocation of the independent drivers according to the practical requirements on applications after understanding the present disclosure.

According to the aforementioned embodiments, when the photoelectric components 142 and the driving circuits are disposed on the same plane of the photoelectric module 140, the distance between both is short thus high-speed transmission can be performed. And when the photoelectric components 142 and the driving circuits are disposed on two different planes of the photoelectric module 140, the distance between both is longer thus it is preferred to be adopted in low-speed transmission. However in the prior arts, the driving circuits are disposed separately with the photoelectric module 140 with even longer distance between the photoelectric components 142 and the driving circuits. Thus the transmission rate is improved by the present disclosure compared to the prior arts. Note that the amplifiers 144 shown in FIG. 5B, FIG. 5C and FIG. 5D can also include the driving circuits as described in the embodiment of FIG. 5A. The photoelectric module 140 shown in FIG. 5B, FIG. 5C and FIG. 5D can also adopt independent drivers for driving the photoelectric components 142 to generate a plurality of optical signals when the photoelectric module 140 of the optical engine 100 is adopted as a signal transmitter.

Figure 6A:
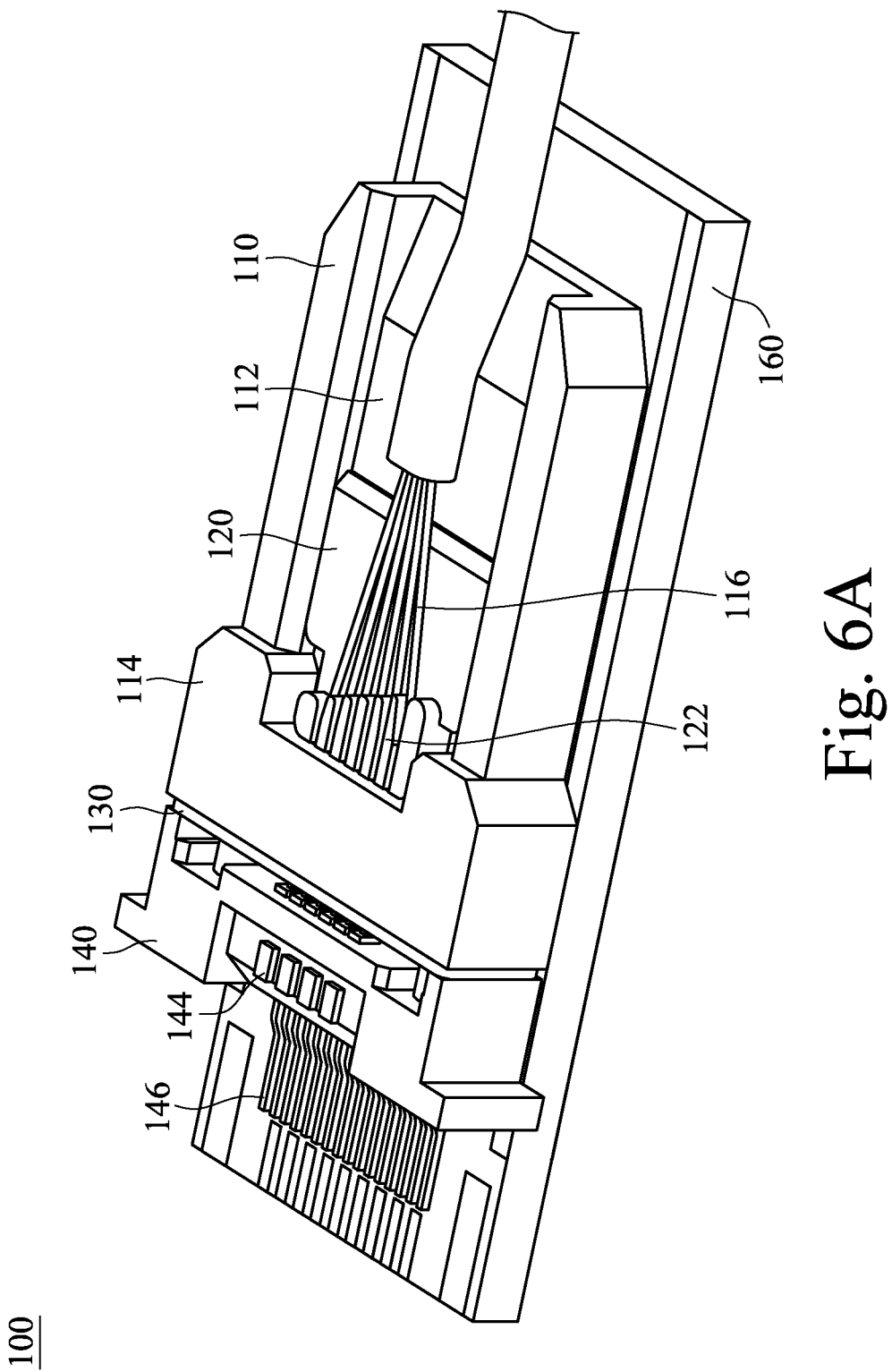
FIG. 6A is a perspective view of an embodiment of an optical engine of the present disclosure including a circuit board.
Figure 6B:
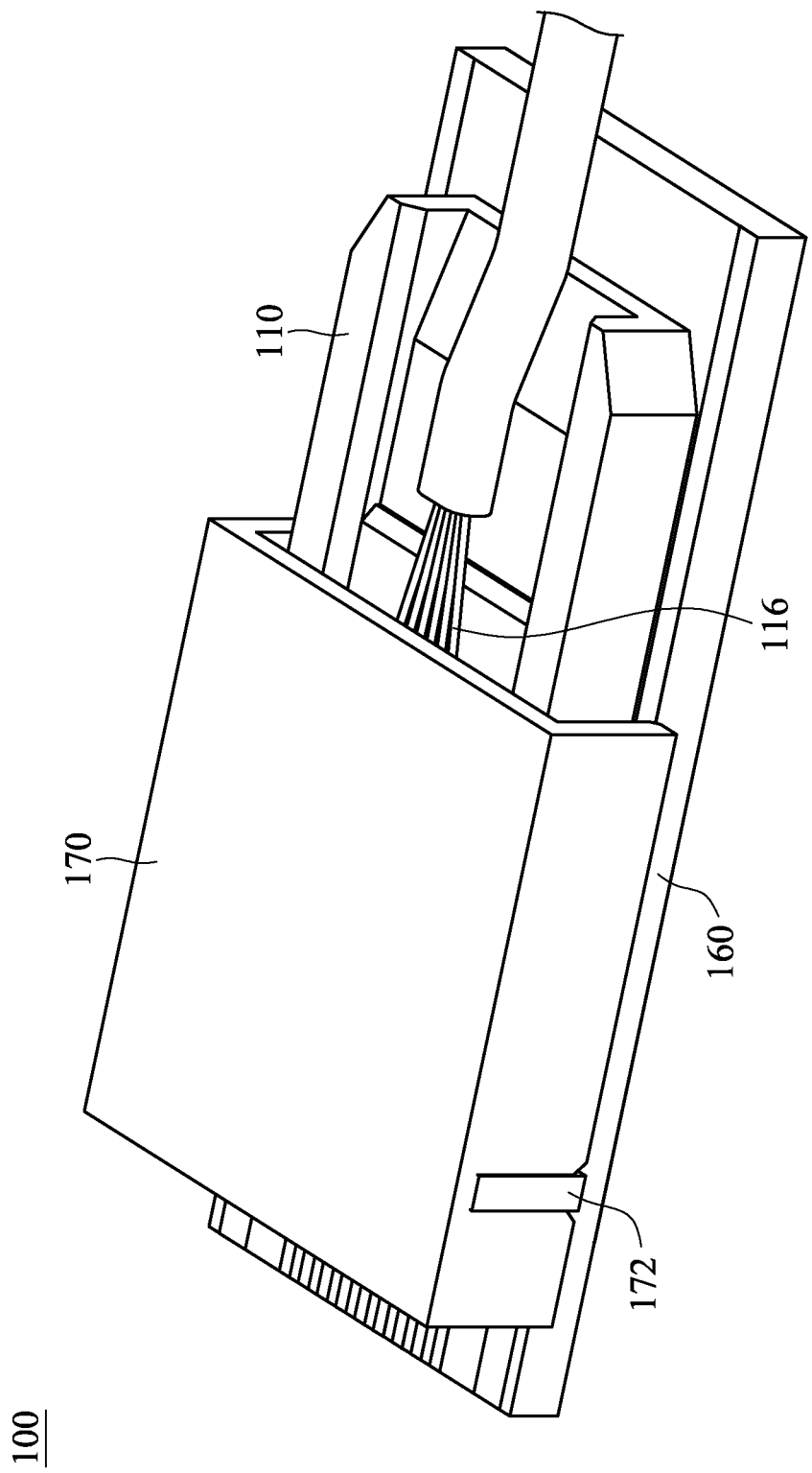
FIG. 6B is a perspective view of the optical engine in FIG. 6A including a cover.

FIG. 6A and FIG. 6B are perspective views of an embodiment of the optical engine 100 of the present disclosure. The optical engine 100 further includes a circuit board 160 as shown in FIG. 6A, and a cover 170 as shown in FIG. 6B, and/or a glue not shown in the figures. The circuit board 160 is for disposing the fiber joint 110, the lens set 130 and the photoelectric module 140. The cover 170 and the circuit board 160 forms an accommodating space for accommodating the fiber joint 110, the fiber pad 120, the lens set 130 and the photoelectric module 140. Both sides of the optical signal output part 114 of the fiber joint 110 have a plurality of assembling grooves 172, shown in FIG. 6B and also FIG. 2C, for assembling to the cover 170. The glue is for sealing the accommodating space.

Figure 7A:
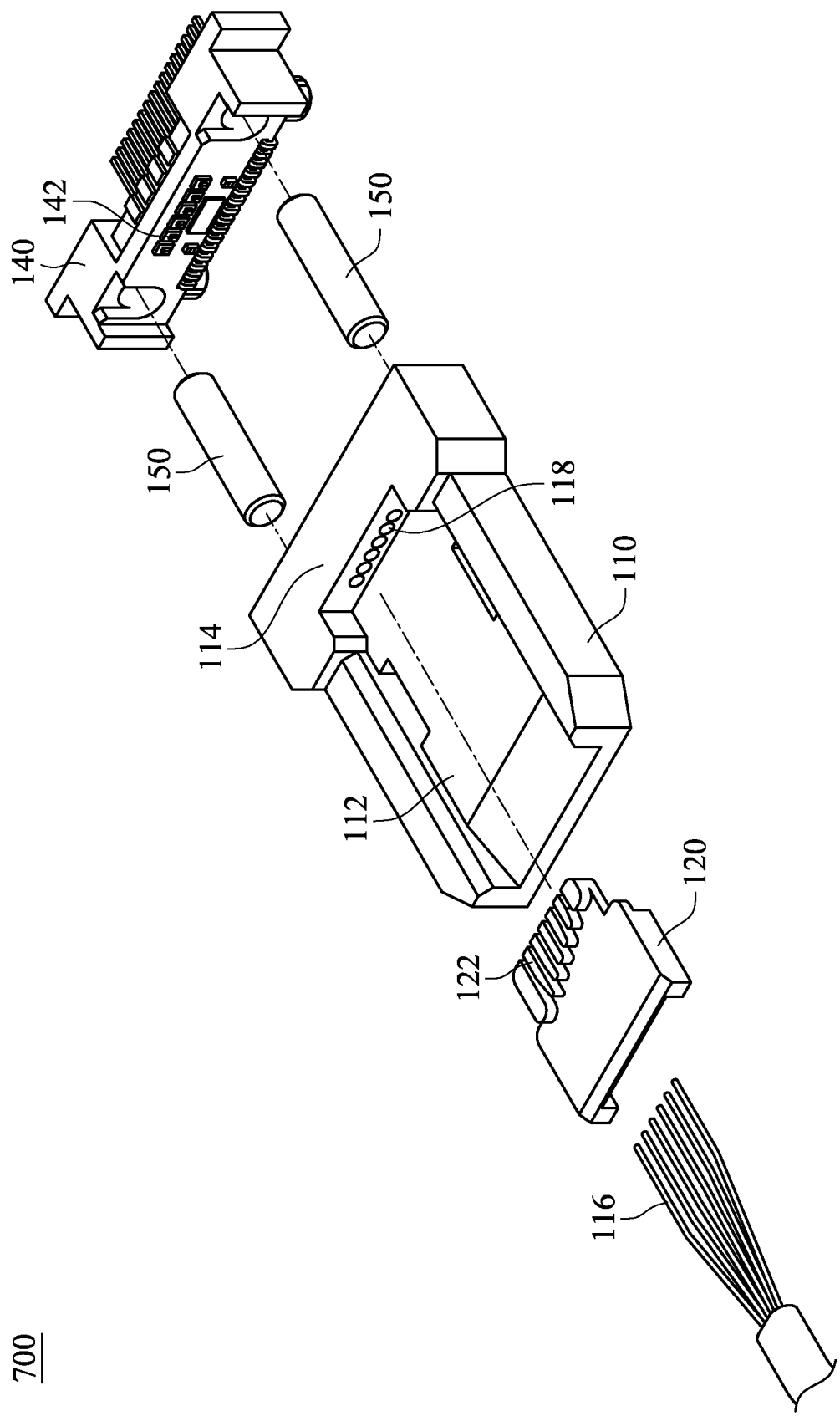
FIG. 7A is an exploded view of the second embodiment of an optical engine of the present disclosure.
Figure 7B:
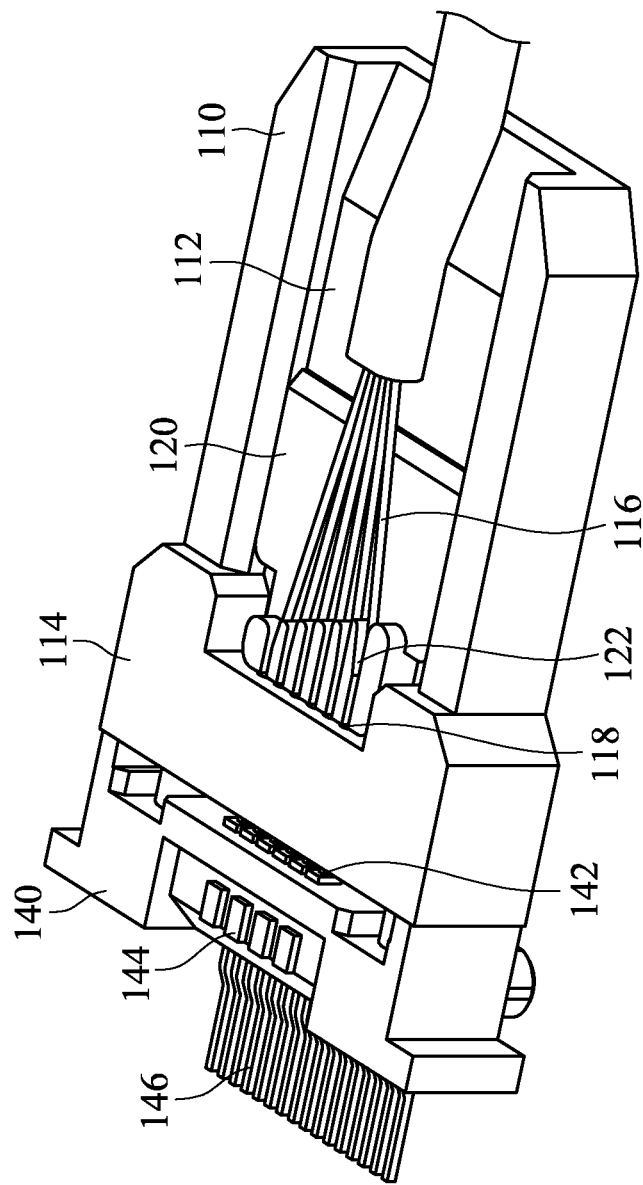
FIG. 7B is a perspective view of the second embodiment of an optical engine of the present disclosure.

FIG. 7A is an exploded view of the second embodiment of an optical engine 700 of the present disclosure. FIG. 7B is a perspective view of the second embodiment of the optical engine 700 of the present disclosure. The major difference of this embodiment and that of FIG. 1A and FIG. 1B is that the lens set 130 is not adopted in this embodiment. The optical signals sent by the fiber joint 110 are photo-coupled to photoelectric components 142 directly. As shown in FIG. 7A and FIG. 7B, the optical engine 700 includes a fiber joint 110, a fiber pad 120 and a photoelectric module 140. The fiber joint 110 includes a fiber installation part 112 and an optical signal output part 114. The fiber installation part 112 is for accommodating a plurality of fibers 116. The optical signal output part 114 includes a plurality of fiber positioning through holes 118 each positions one of the plurality of fibers 116 with one terminal and outputs an optical signal of the corresponding fiber with the other terminal. The fiber pad 120 is disposed on the fiber installation part 112 and includes a plurality of fiber guiding grooves 122 which respectively guide the plurality of fibers 116 to the corresponding fiber positioning through holes 118. The photoelectric module 140 is assembled to the fiber joint 110 and includes a plurality of photoelectric components 142 for converting the optical signals coming from the plurality of fiber positioning through holes 118 into electric signals.

Note that the fiber joint 110, the fiber pad 120 and the photoelectric module 140 described in this embodiment can further include a part of or all the technical characteristics of those described in the aforementioned embodiments. For example the assembling method of the fiber joint 110 and the fiber pad 120, the determination of the length of the fiber guiding grooves 122 and the design of the photoelectric module 140. Those skilled in the art can apply a part of or all the technical characteristics of those described in the aforementioned embodiments in this embodiment after understanding the aforementioned embodiments. Thus without effecting the understanding of the present disclosure, the descriptions of applications of these technical characteristics is omitted herein.

Figure 8A:
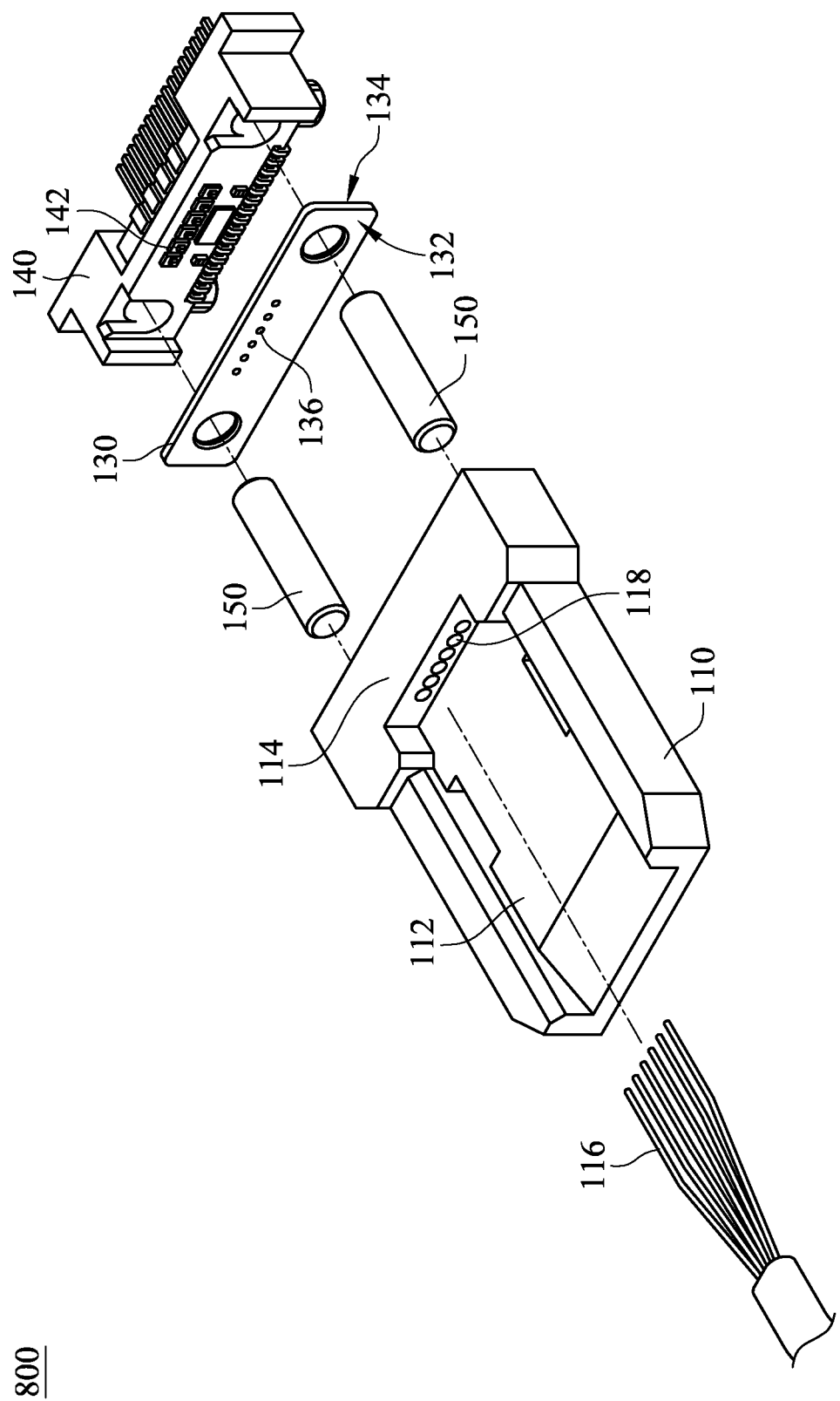
FIG. 8A is an exploded view of the third embodiment of an optical engine of the present disclosure.
Figure 8B:
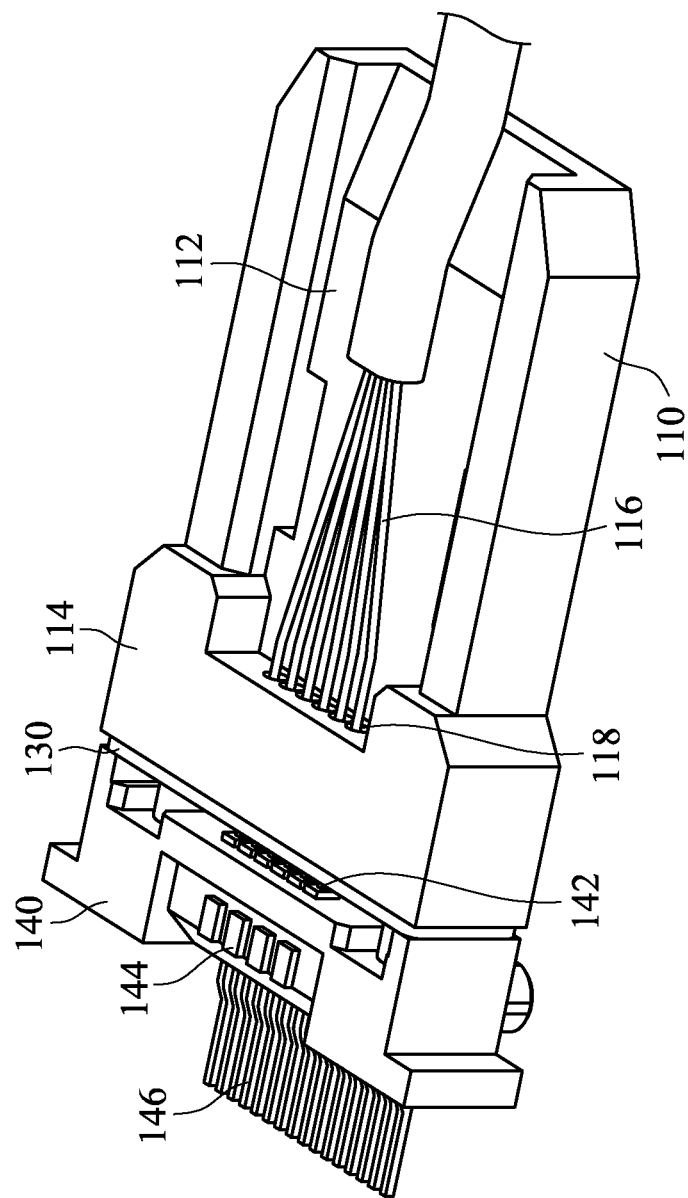
FIG. 8B is a perspective view of the third embodiment of an optical engine of the present disclosure.

FIG. 8A is an exploded view of the third embodiment of an optical engine 800 of the present disclosure. FIG. 8B is a perspective view of the third embodiment of the optical engine 800 of the present disclosure. The major difference of this embodiment and that of FIG. 1A and FIG. 1B is that the fiber pad 120 is not adopted in this embodiment. A plurality of fibers 116 are positioned to a plurality of fiber positioning through holes 118 of the fiber joint 110 directly. As shown in FIG. 8A and FIG. 8B, the optical engine 800 includes a fiber joint 110, a lens set 130 and a photoelectric module 140. The fiber joint 110 includes a fiber installation part 112 and an optical signal output part 114. The fiber installation part 112 is for accommodating a plurality of fibers 116. The optical signal output part 114 includes a plurality of fiber positioning through holes 118 each positions one of the plurality of fibers 116 with one terminal and outputs an optical signal of the corresponding fiber 116 with the other terminal. The lens set 130 is assembled to the fiber joint 110 and includes an optical signal input side 132, an optical signal output side 134, a plurality of first lenses 136 and a plurality of second lenses 138 (as also shown in FIG. 4A, FIG. 4B, FIG. 4C and FIG. 4d). The plurality of first lenses 136 are disposed on the optical signal input side 132 for receiving the optical signals coming from the plurality of optical positioning through holes 118. The plurality of second lenses 138 are disposed on the optical signal output side 134 for outputting the optical signals originated from the plurality of first lenses 136. Diameters of the plurality of first lenses 136 are different from those of the plurality of second lenses 138. The photoelectric module 140 is assembled to the lens set 130 and the fiber joint 110. The photoelectric module 140 includes a plurality of photoelectric components 142 for converting the optical signals coming from the plurality of second lenses 138 into electric signals.

Note that the fiber joint 110, the lens set 130 and the photoelectric module 140 described in this embodiment can further include a part of or all the technical characteristics of those described in the aforementioned embodiments. For example the determination of the diameter and category of the first lenses 136 and the second lenses 138, and the design of the photoelectric module 140. Those skilled in the art can apply a part of or all the technical characteristics of those described in the aforementioned embodiments in this embodiment after understanding the aforementioned embodiments. Thus without effecting the understanding of the present disclosure, the descriptions of applications of these technical characteristics is omitted herein.

Figure 9A:
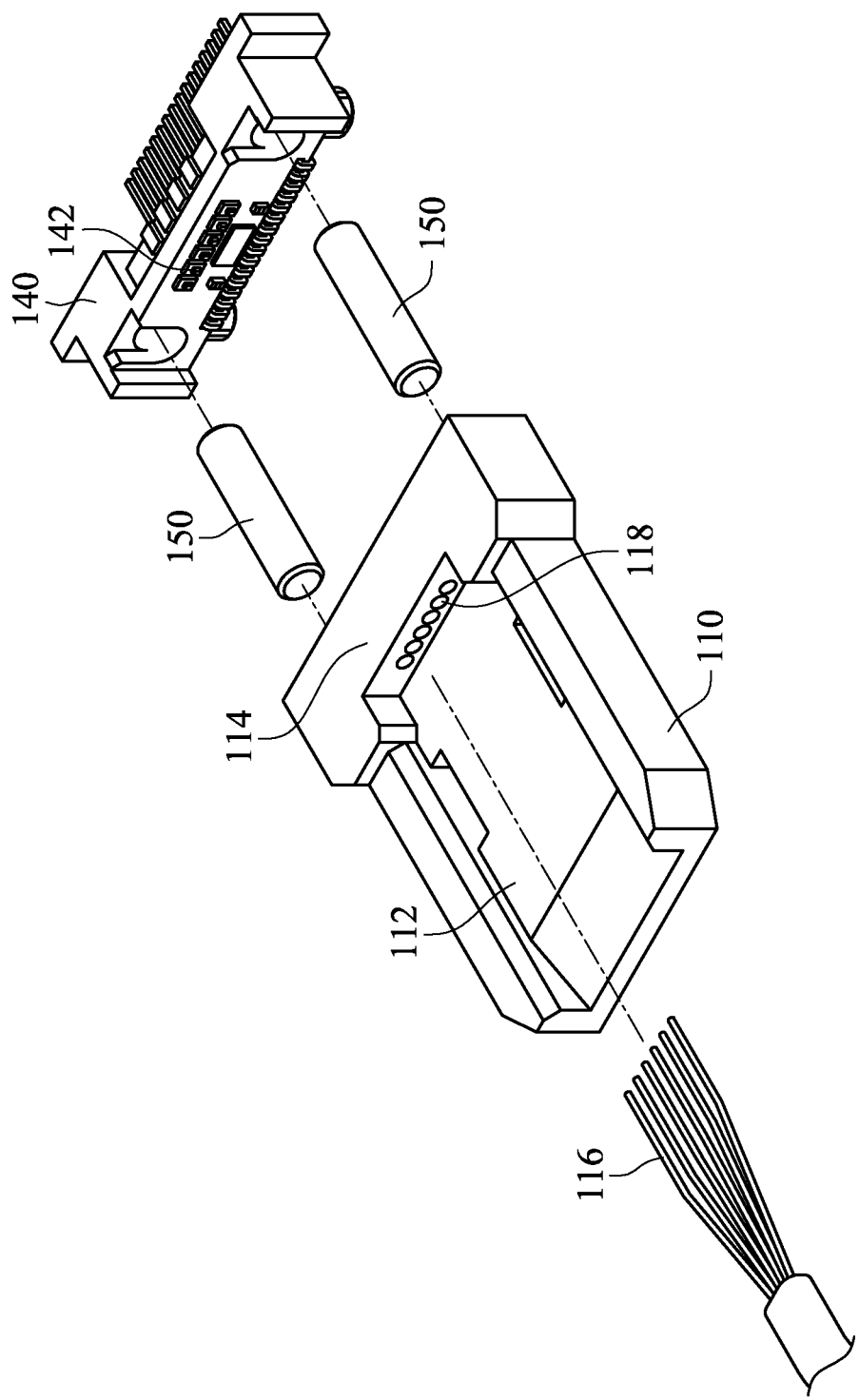
FIG. 9A is an exploded view of the fourth embodiment of an optical engine of the present disclosure.
Figure 9B:
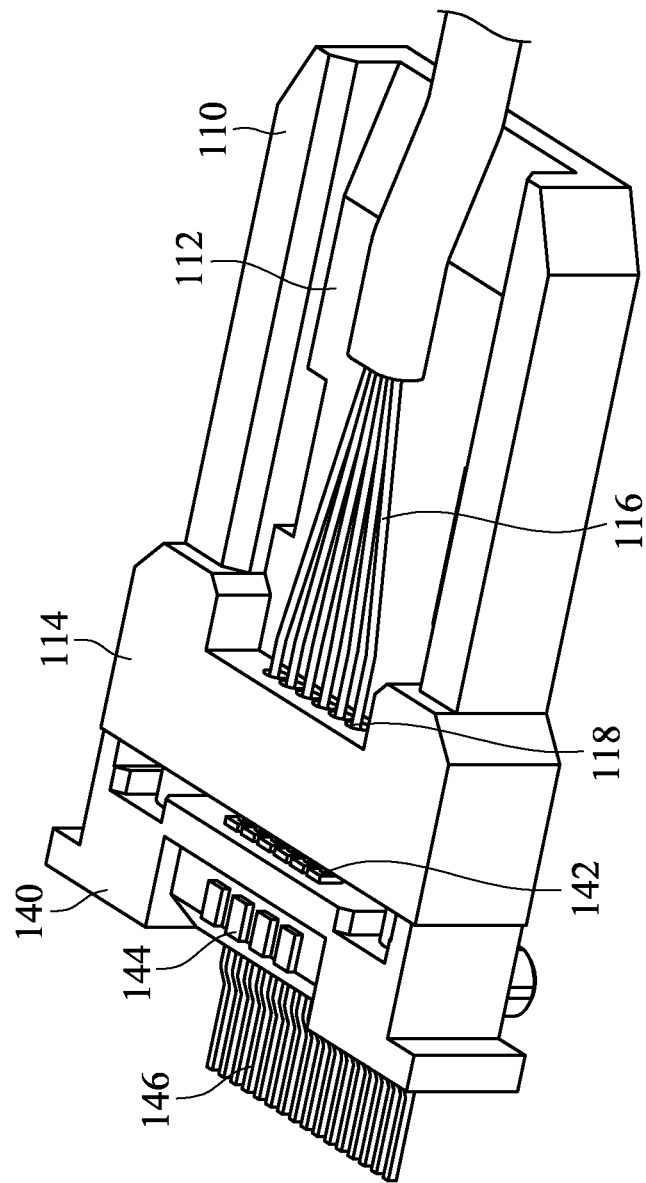
FIG. 9B is a perspective view of the fourth embodiment of an optical engine of the present disclosure.

FIG. 9A is an exploded view of the fourth embodiment of an optical engine 900 of the present disclosure. FIG. 9B is a perspective view of the fourth embodiment of the optical engine 900 of the present disclosure. The major difference of this embodiment and that of FIG. 1A and FIG. 1B is that the fiber pad 120 and the lens set 130 are not adopted in this embodiment. Instead a plurality of fibers 116 are positioned to a plurality of fiber positioning through holes 118 of the fiber joint 110 directly, and the optical signals sent by the fiber joint 110 are photo-coupled to photoelectric components 142 directly. As shown in FIG. 9A and FIG. 9B, the optical engine 900 includes a fiber joint 110, a photoelectric module 140 and a plurality of positioning components 150. The fiber joint 110 includes a fiber installation part 112 and an optical signal output part 114. The fiber installation part 112 is for accommodating a plurality of fibers 116. The optical signal output part 114 includes a plurality of fiber positioning through holes 118 and a plurality of positioning hole 152 (as also shown in FIG. 2A). Each of the fiber positioning through holes 118 positions one of the plurality of fibers 116 with one terminal and outputs an optical signal of the corresponding fiber 116 with the other terminal. The photoelectric module 140 is assembled to the fiber joint 110 and includes a plurality of photoelectric components 142 and a plurality of positioning parts 147 (as also shown in FIG. 5A). The plurality of photoelectric components 142 are for converting the optical signals coming from the plurality of fiber positioning through holes 118 into electric signals. Each of the plurality of positioning parts 147 includes a positioning component guiding groove 148 and a positioning hole 152 (as also shown in FIG. 5A). The positioning component guiding groove 148 is for guiding and plugging a positioning component into the positioning hole 152. The plurality of positioning components 150 are combined with the plurality of positioning holes 152 on the fiber joint 110 and the photoelectric module 140 respectively to assemble the fiber joint 110 and the photoelectric module 140 detachably. The plurality of positioning components 150 are discrete components separated from the fiber joint 110 and the photoelectric module 140 before assembling.

Note that the fiber joint 110 and the photoelectric module 140 described in this embodiment can further include a part of or all the technical characteristics of those described in the aforementioned embodiments. For example the design of the photoelectric module 140 and the adoption of the discrete positioning components 150.

What is claimed is:

1. An optical engine, comprising:
   a fiber joint, having a fiber installation part and an optical signal output part, wherein the fiber installation part is for accommodating a plurality of fibers, the optical signal output part includes a plurality of fiber positioning through holes running through the optical signal part, wherein each of the plurality of fibers plugs into one terminal of each positioning through hole and outputs an optical signal via the other terminal of the positioning through hole;
   a fiber pad, disposed on the fiber installation part and having a plurality of fiber guiding grooves which respectively guide the plurality of fibers to the corresponding fiber positioning through holes;
   a photoelectric module, assembled to the fiber joint and having a plurality of photoelectric components, wherein each of the photoelectric components is aligned with one of the positioning through holes for converting the optical signals coming from the fiber positioning through holes into electric signals; and
   a plurality of positioning components, wherein each of the optical signal output part of the fiber joint and the photoelectric module includes a plurality of positioning holes matching to the plurality of positioning components assembling the fiber joint and the photoelectric module detachably.

2. The optical engine of claim 1, wherein the fiber installation part comprises at least one first fixing part, and the fiber pad comprises at least one second fixing part matching to the first fixing part on structure to fix the fiber pad to the fiber installation part.

3. The optical engine of claim 1, wherein at least two of the plurality of fiber guiding grooves have different lengths.

4. The optical engine of claim 3, wherein the lengths of the plurality of fiber guiding grooves increase or decrease gradually on space.

5. The optical engine of claim 1, wherein the fiber pad further comprises a plurality of separating islands for separating the plurality of guiding grooves, each of the separating island including two side walls, and a non-zero angle exists between a plane of each of side walls and a tangent line of the corresponding guiding groove wherein the two side walls are on some or all of each of the separating islands at a terminal, away from the fiber positioning through holes, of the separating islands.

6. The optical engine of claim 1, wherein the photoelectric module further comprises:
   at least one amplifier, for amplifying electric signals coming from the plurality of photoelectric components and outputting the amplified signals; and
   a plurality of output terminals, for conducting the amplified signals coming from the amplifier.

7. The optical engine of claim 6, wherein the amplifier and the plurality of photoelectric components are disposed on the same plane or two perpendicular planes of the photoelectric module and electrically connected to each other.

8. The optical engine of claim 1, wherein the photoelectric module further comprises a plurality of positioning parts each has a positioning component guiding groove and a positioning hole, and the positioning component guiding groove is for guiding and plugging a positioning component into the positioning hole.

9. The optical engine of claim 1, wherein a plane of a surface of the optical joint fiber joint outputting the optical signals is an inclined plane, and an angle between the inclined plane and a vertical line is between 1 and 6 degrees.

10. The optical engine of claim 8, wherein the positioning components are discrete components separated from the fiber joint and the photoelectric module before assembling.

11. The optical engine of claim 6, further comprising:
a plurality of output conducting lines, bent to be disposed on the first surface and a second surface of the photoelectric module, one terminal of each of the plurality of output conducting lines disposed on the first surface and electrically connected to one of the plurality of the photoelectric components, and the other terminal of each of the plurality of output conducting lines disposed on the second surface; and
a circuit board having a plurality of through holes wherein the fiber joint and the photoelectric module are disposed on a top surface of the circuit board, and the plurality of output conducting lines electrically connected to the circuit board;
wherein the amplifier is disposed on a bottom surface of the circuit board and electrically connected to the plurality of output conducting lines via the plurality of through holes.

* * * * *